United States Patent
Zhuang et al.

(10) Patent No.: US 10,721,670 B2
(45) Date of Patent: Jul. 21, 2020

(54) SYSTEM AND METHOD OF REBROADCASTING MESSAGES FOR RELIABLE VEHICULAR COMMUNICATIONS

(71) Applicants: Weihua Zhuang, Waterloo (CA); Sailesh Bharati, Ottawa (CA); Hassan Aboubakr Omar, Kanata (CA)

(72) Inventors: Weihua Zhuang, Waterloo (CA); Sailesh Bharati, Ottawa (CA); Hassan Aboubakr Omar, Kanata (CA)

( * ) Notice: Subject to any disclaimer, the term of this patent is extended or adjusted under 35 U.S.C. 154(b) by 19 days.

(21) Appl. No.: 16/312,107

(22) PCT Filed: Jun. 27, 2017

(86) PCT No.: PCT/CA2017/050773
§ 371 (c)(1),
(2) Date: Dec. 20, 2018

(87) PCT Pub. No.: WO2018/000084
PCT Pub. Date: Jan. 4, 2018

(65) Prior Publication Data
US 2019/0239137 A1 Aug. 1, 2019

Related U.S. Application Data

(60) Provisional application No. 62/493,224, filed on Jun. 27, 2016.

(51) Int. Cl.
*H04L 12/28* (2006.01)
*H04W 40/02* (2009.01)
(Continued)

(52) U.S. Cl.
CPC ............ *H04W 40/026* (2013.01); *H04K 3/41* (2013.01); *H04W 4/40* (2018.02); *H04W 40/12* (2013.01);
(Continued)

(58) Field of Classification Search
CPC ... H04B 7/2643; H04B 7/2656; H04J 3/1694; H04L 12/18; H04L 12/185; H04L 45/16;
(Continued)

(56) References Cited

U.S. PATENT DOCUMENTS 7,848,278 B2 * 12/2010 Chen .................... H04B 7/2606
370/328
8,488,545 B2 * 7/2013 Chen .................... H04W 74/08
370/329
(Continued)

OTHER PUBLICATIONS

Bharati et al, CRB: Cooperative Relay Broadcasting for Safety Applications in Vehicular Networks, IEEE, 12 pages, 2015.*
(Continued)

*Primary Examiner* — Frank Duong

(57) ABSTRACT

In vehicular ad hoc networks (VANETs), vehicles communicate either with each other via vehicle-to-vehicle (V2V) communication or with stationary road side infrastructure or road side units (RSUs) via vehicle-to-infrastructure (V2I) communication, to exchange information generated by the mobile applications. Vehicular networks require a reliable and efficient one-hop broadcast service. A makeup strategy for vehicular networks, referred to as cooperative relay broadcasting (CRB), is described. Neighboring nodes rebroadcast the packet from a source node to increase the reliability of the broadcast service. The decision to perform CRB is taken proactively and based on the channel conditions between the relaying nodes and the target one-hop neighbors.

20 Claims, 11 Drawing Sheets

(51) Int. Cl.
| | |
|---|---|
| *H04W 88/04* | (2009.01) |
| *H04W 76/40* | (2018.01) |
| *H04W 40/12* | (2009.01) |
| *H04W 4/40* | (2018.01) |
| *H04K 3/00* | (2006.01) |
| *H04W 40/22* | (2009.01) |
| *H04W 40/24* | (2009.01) |
| *H04W 48/16* | (2009.01) |
| *H04W 48/18* | (2009.01) |
| *H04W 72/04* | (2009.01) |
| *H04W 74/08* | (2009.01) |
| *H04B 7/26* | (2006.01) |
| *H04J 3/00* | (2006.01) |
| *H04W 28/04* | (2009.01) |
| *H04W 84/18* | (2009.01) |

(52) U.S. Cl.
CPC ......... *H04W 40/22* (2013.01); *H04W 40/246* (2013.01); *H04W 48/16* (2013.01); *H04W 48/18* (2013.01); *H04W 72/0446* (2013.01); *H04W 74/0816* (2013.01); *H04W 76/40* (2018.02); *H04W 88/04* (2013.01); *H04B 7/2606* (2013.01); *H04J 3/00* (2013.01); *H04W 28/04* (2013.01); *H04W 84/18* (2013.01)

(58) Field of Classification Search
CPC ................. H04L 49/201; H04Q 11/04; H04Q 2213/13292; H04W 28/04; H04W 40/02; H04W 40/026; H04W 40/12; H04W 40/22; H04W 40/24; H04W 4/40; H04W 40/246; H04W 48/16; H04W 48/18; H04W 72/04; H04W 72/0446; H04W 74/04; H04W 74/08; H04W 74/0816; H04W 76/40; H04W 88/04; H04W 88/08
See application file for complete search history.

(56) References Cited

U.S. PATENT DOCUMENTS

| | | | |
|---|---|---|---|
| 9,491,684 B2* | 11/2016 | Cordeiro De Oliveira Barros ..... | H04W 40/20 |
| 2009/0167513 A1* | 7/2009 | Hill ........................ | G01S 5/0072 340/435 |
| 2018/0176750 A1* | 6/2018 | Xu .......................... | H04L 29/08 |

OTHER PUBLICATIONS

An et al, An Analytical Model for TDMA-based MAC Protocols in VANETs, WPMC2014, 6 pages, 2014.*
Omar et al, Performance Evaluation of VeMAC Supporting Safety Applications in Vehicular Networks, IEEE, 15 pages, 2013.*
Omar et al, VeMAC: A TDMA-Based MAC Protocol for Reliable Broadcast in VANETs, IEEE, 13 pages, Sep. 2013.*
Park et al, ROB/CN: An Efficient Reliable 1-Hop Broadcast Using CSMA/CN in Mobile Ad Hoc Networks, IEEE, 5 pages, 2011.*
Omar et al, Evaluation of VeMAC for V2V and V2R Communications Under Unbalanced Vehicle Traffic, IEEE, 5 pages, 2012.*
Omar et al, VeMAC: A Novel Multichannel MAC Protocol for Vehicular Ad Hoc Networks, IEEE, 6 pages, 2011.*
Alasmary et al, The Mobility Impact in IEEE 802.11p Infrastructureless Vehicular Networks, IEEE, 5 pages, 2010.*

* cited by examiner

SYSTEM AND METHOD OF REBROADCASTING MESSAGES FOR RELIABLE VEHICULAR COMMUNICATIONS

FIELD OF INVENTION

The invention relates generally to the field of vehicular communications. In particular, the invention relates to system and method of rebroadcasting messages for reliable vehicular communications.

BACKGROUND OF INVENTION

Vehicular ad hoc network (VANET) is a promising component to enable a wide range of mobile distributed applications in order to improve the safety and efficiency of vehicle transportation. In VANETs, vehicles communicate either with each other via vehicle-to-vehicle (V2V) communication or with stationary road side infrastructure or road side units (RSUs) via vehicle-to-infrastructure (V2I) communication, to exchange information generated by the mobile applications. Thus, vehicles communicate via a radio channel to exchange messages primarily to support applications that improve road safety, also referred to as safety messages and applications, respectively.

Most safety applications require disseminating messages to all the nodes (vehicles and RSUs) within one-hop transmission distance of the corresponding node. Consequently, safety messages are broadcasted such that the messages are disseminated to each one of the nodes within an area of interest, e.g., within one-hop transmission distance of the source node. The lifetime of safety messages is typically less than 100 ms within the area of interest. In addition, substantially all nodes, for example at least 99% of nodes, in the area of interest must receive safety messages. Vehicular networks require a reliable and efficient one-hop broadcast service from its medium access control (MAC) layer protocol to successfully deploy safety applications that have stringent quality-of-service (QoS) requirements. Therefore, safety applications generally have strict QoS requirements, i.e., high communication reliability and strict delay constraints. For example, to meet the strict QoS requirements, it will be necessary for a message to reach at least 99% of the target destination nodes within 100 ms. This standard may be difficult to meet due to the dynamic networking conditions in vehicular networks.

The forgoing creates challenges and constraints for establishing and maintaining reliable vehicular communications among nodes in VANETs. There is therefore a need for a method and system of rebroadcasting messages for reliable vehicular communications in order to meet the strict QoS requirements. It is an object of the present invention to mitigate or obviate at least one of the above mentioned disadvantages.

SUMMARY OF INVENTION

The invention relates to a system and methodology to implement a node cooperation based re-broadcasting technique, referred to as cooperative relay broadcasting (CRB), for vehicular communication systems. Nodes (i.e., vehicles or RSUs) that successfully received a packet from a source node rebroadcast the packet, making it available for nodes that have failed to receive the packet, to improve reliability of message broadcasting for safety applications. Due to the dynamic nature, messages generally are not relevant beyond certain time limit (for example, 100 ms) and are considered to be expired. Hence, rebroadcasting is done to ensure that a maximum number of nodes receive the packet before the message expires.

For enhanced reliability of vehicular communication system and to support safety applications with strict service requirements, the CRB is performed by specifically selected nodes. These nodes are referred to as the best helper nodes and generally are required to be in source node's communication range and have a high chance to deliver the packet to the nodes which failed to receive the packet from the source node (i.e., the best helper node and the nodes to receive the packet from the best helper node are in a good channel condition). The main objective of such a CRB framework is to maximize the number of nodes that will successfully receive a packet from a source node before the packet expires. Here, communication range refers to a distance (e.g., measured in meters) within which two nodes can communicate directly. Such a communication range exists due to factors such as transmission power of a transmitting node, sensitivity of a receiving node, communication quality of wireless medium, etc., or combinations thereof.

In a first aspect of the invention, there is provided a method of rebroadcasting messages to improve vehicular communications among a plurality of nodes in a vehicular ad hoc network. The plurality of nodes communicates with each other following a time division multiple access (TDMA) protocol, wherein time is partitioned into time frames, each time frame is partitioned into time slots, and each node is to be assigned one of the time slots for transmission. The method comprises the steps of, at a node of the plurality of nodes and by the node, a) broadcasting in its assigned time slot in a time frame and listening to other nodes in all other time slots in the time frame, b) if, during listening, data is received in a time slot from a transmitting node that is a one-hop neighbor (OHN) of both the node and another node that is a source node having transmitted previously in the time frame a tagged data packet, 1) dividing all OHN nodes of the source node into a set of success nodes and a set of failure nodes, with respect to the source node, by utilizing frame information received from the transmitting node and from other OHN nodes, 2) before expiry of the tagged data packet and if the set of failure nodes has at least one member, i) determining if the node is a potential best helper node to rebroadcast the tagged data packet, ii) in an unreserved time slot subsequent to the time slot, rebroadcasting the data packet if the node is determined to be a best helper node, and iii) updating the set of failure nodes and the set of success nodes after rebroadcasting.

As a feature of this aspect of the invention, the sub-step 1) of step b) of dividing further comprises the steps of, first, identifying success nodes in the OHN nodes that have reported successful receipt of the tagged data packet and failure nodes in the OHN nodes that have reported failure of receipt of the tagged data packet, next, for each node in the remainder of the OHN nodes, excluding the success nodes, evaluating the likelihood of a recipient node in the remainder of the OHN nodes that is able to receive the tagged data packet from the source node and categorizing the recipient node as a failure node if the likelihood is not above a selected threshold value and as a success node if the likelihood is above the selected threshold value, and, finally, unifying the failure nodes that have reported failure with the failure nodes having the likelihood not above the selected threshold value to form the set of failure nodes.

As another feature of this aspect of the invention, the set of success nodes is formed by either unifying the success nodes that that have reported success with the success nodes having the likelihood above the selected threshold value or is formed by excluding the set of failure nodes from the OHN nodes.

As yet another feature of this aspect of the invention, the evaluation of likelihood of being able to receive the tagged data includes evaluation of whether the recipient node can receive the tagged data packet in the current time slot or in future time slots in the time frame.

As yet another feature, the evaluation of likelihood of being able to receive the tagged data includes evaluating likelihood of the recipient node receiving the tagged data packet indirectly through cooperative relay broadcasting (CRB). The step of dividing further comprises removing the recipient node from the set of failure nodes if the likelihood of the recipient node receiving the tagged data packet through CRB exceeds the selected threshold value.

As one of the other features, in step b.2), the step of determining if the node is a potential best helper node further comprises, first, evaluating number of failure nodes the nodes is predicted to be able to reach in a single CRB transmission, next, evaluating number of failure nodes that each of the other of success nodes is predicted to be able to reach in a single CRB transmission, next, if no other success node is evaluated to be able to reach more failure nodes than the node, designating the node as the potential best helper node, and if at least another success node is evaluated to be able to reach an equal number of failure nodes as the node, selecting the potential best helper node among the node and the at least another success node through a tie-breaker.

In another feature, the step of rebroadcasting comprises the further sub-steps, performed at each potential best helper nodes and by each of the potential best helper nodes, selecting a random short-burst period shorter than the time slot, transmitting a channel jamming signal during the short-burst period, upon finishing transmission of the black-burst, listening for other channel jamming signals in the time slot, and if any other channel jamming signal is detected, performing no rebroadcasting, or if no channel jamming signal is detected, broadcasting the tagged data packet in the remainder of the time slot.

As a feature of this aspect of the invention, the step b) further comprises the sub-steps of, from the frame information received, determining if any OHN node of the node has failed to receive a data packet from the node, and if there is at least one OHN node that has failed, selecting another time slot from unreserved time slots available in the time frame and making the previously reserved time slot available as unreserved. As an additional feature, a time slot is reserved by including information associating a node with the time slot in the frame information and is made available as unreserved by disassociating the node with the time slot.

In another aspect of the invention, there is provided a system of a plurality of nodes communicating with each other in a vehicular ad hoc network, the plurality of nodes communicating with each other following a time division multiple access (TDMA) protocol, wherein time is partitioned into time frames, each time frame is partitioned into time slots, and each node is to be assigned one of the time slots for transmission. Each node of the plurality of nodes a) broadcasts in its assigned time slot in a time frame and listens to other nodes in all other time slots in the time frame, and b) if, during listening, data is received in a time slot from a transmitting node that is a one-hop neighbor (OHN) of both the listening node and another node that is a source node having transmitted previously in the time frame a tagged data packet, the listening node 1) divides all OHN nodes of the source node into a set of success nodes and a set of failure nodes, with respect to the source node, by utilizing frame information received from the transmitting node and from other OHN nodes, and 2) before expiry of the tagged data packet and if the set of failure nodes has at least one member, i) determines if the listening node is a potential best helper node to rebroadcast the tagged data packet, ii) in an unreserved time slot subsequent to the time slot, rebroadcasts the data packet if the listening node is determined to be a best helper node, and iii) updates the set of failure nodes and the set of success nodes after rebroadcasting.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which.

DETAILED DESCRIPTION OF EMBODIMENTS

Figure 1:
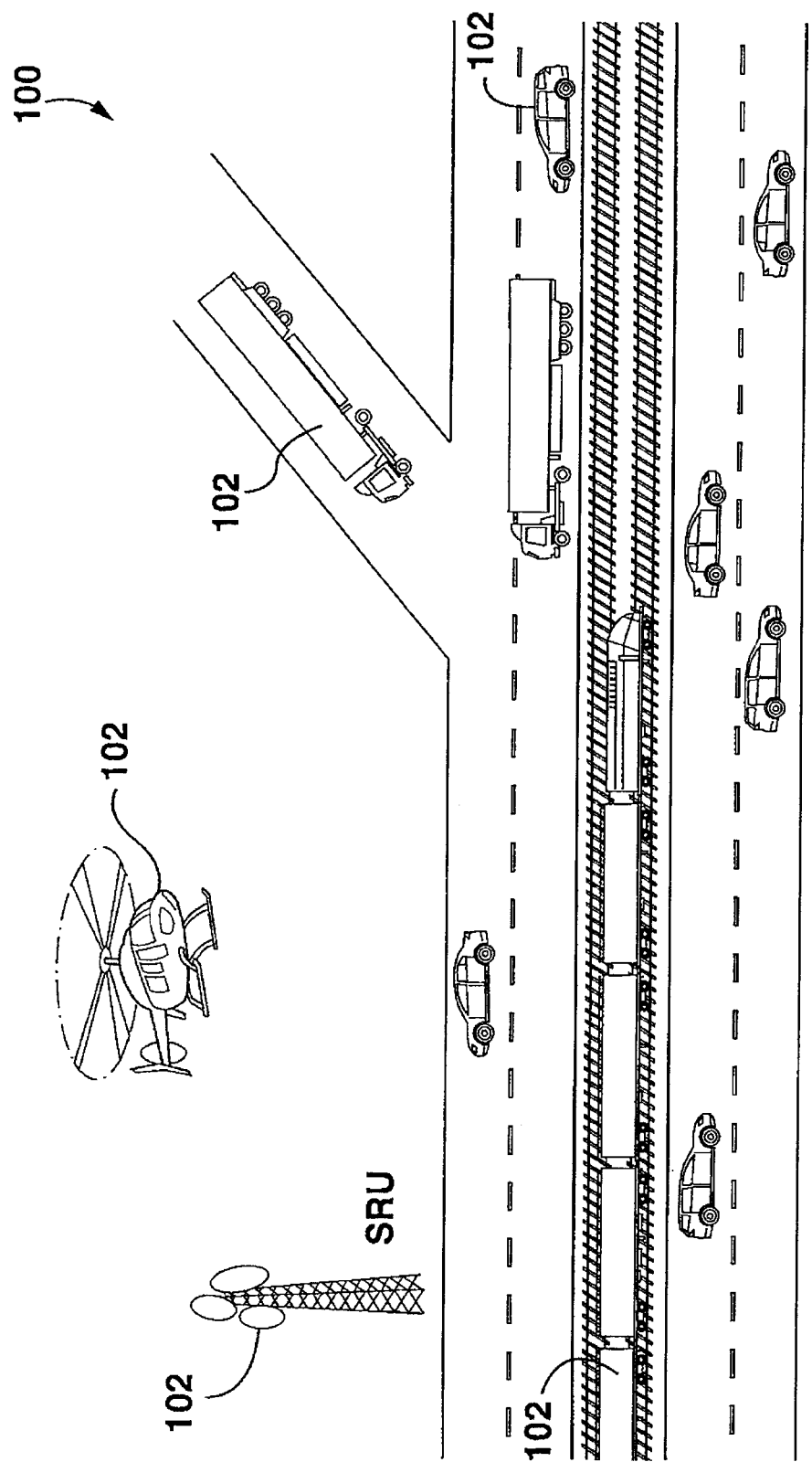
FIG. 1 is a diagram showing a system in which a plurality of nodes communicating with each other according to an embodiment of the present invention.

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

In a vehicular ad hoc network, vehicles communicate either with each other via vehicle-to-vehicle communication or with stationary road side infrastructure or road side units via vehicle-to-infrastructure communication, to exchange information generated by on-board mobile applications. Vehicular networks require a reliable and efficient broadcast service to successfully deploy the safety applications with stringent quality-of-service requirements.

According to a makeup strategy for vehicular networks, referred to as cooperative relay broadcasting, neighboring nodes rebroadcast the packet from a source node, increasing the reliability of the broadcast service. Here, "nodes" include both vehicles and RSUs. The decision to perform CRB is taken proactively and based on the channel conditions between the relaying nodes and the target one-hop neighbors. Disclosed in detail herein are i) a system to rebroadcast the safety messages targeting the one-hop neighboring nodes of a source node of the safety messages; ii) a procedure to select a node to perform CRB to rebroadcast the messages without creating any conflict among neighboring nodes while rebroadcasting the message; and iii) a procedure to implement CRB and its functionalities based on this methodology.

Referring to FIG. 1, there is shown a system 100, in which a plurality of nodes 102, including vehicles and RSUs, communicate with each other in a communication network. Such communication may be wireless vehicular communications in a vehicular ad hoc network. Here, "vehicle" shall mean a movable object for carrying load, whether self-propelled or driven by another self-propelled moving object, and may include road vehicles such as automobiles, buses, transportation trucks, trailers or other heavy good vehicles, railroad vehicles such as trains or individual cars of a train, aerial vehicles such as passenger airplanes, helicopters, unmanned aerial vehicles (UAVs), or ships, boats, underwater vehicles such as submarines, among others. The term "vehicular communications" includes both vehicle-to-vehicle communications, i.e., communications between and among vehicles, and vehicle-to-infrastructure communications, i.e., communications between vehicles and stationary road side infrastructure or road-side-units. The vehicular communications are wireless, which may be by way of radio signals, infra-red signals, microwave signals, optical or ultra-violet signals, sound signals, among others.

Figure 2:
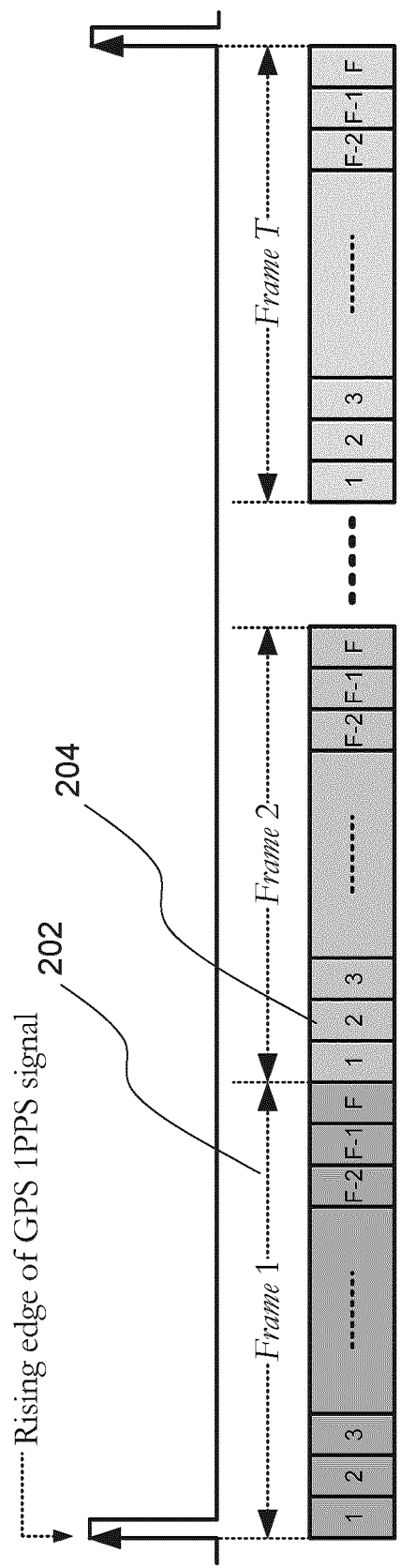
FIG. 2 provides an illustrative example, showing a time division scheme that may be employed by the nodes.

Vehicular communications in a VANET is established according to a media access control protocol. The MAC protocol generally adopts a time division multiple access (TDMA) technique. In time division channel access technique, channel time is partitioned into time frames 202 and each time frame 202 is further partitioned into a plurality of time slots 204, which may be indexed, such as 1, 2, 3, . . . , F−1, F, as indicated in FIG. 2. Each time slot may be of a constant time interval, though this is for convenience only and not required. Each frame may by convention consist of a fixed number of time slots, denoted by F, as illustrated in FIG. 2. The beginning of a time frame may be defined with reference to an external timing signal, such as a GPS signal.

Figure 3:
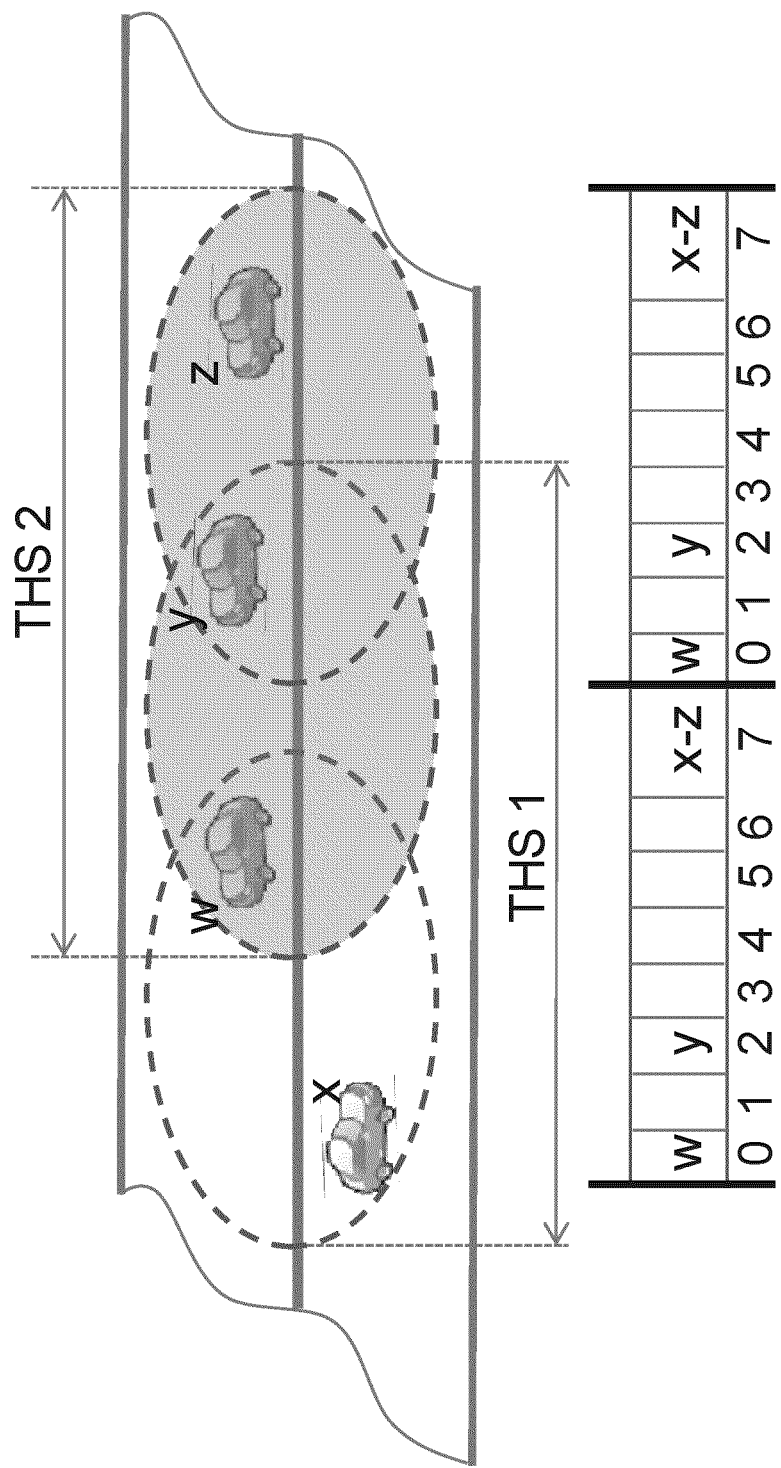
FIG. 3 illustrates an example of allocating time slots to nodes in the system of FIG. 1.

Each node 102 maintains sets of neighboring nodes that are in its one-hop and two-hop transmission distances, referred to as one-hop set (OHS) and two-hop set (THS) respectively, based on information exchanged among neighboring nodes. For any given time slot 204, only one node 102 in a THS is permitted to transmit in that time slot. Formation of a THS therefore discourages simultaneous usage of a time slot by more than one node within the same interference range, thus minimizing hidden and/or exposed node problems. Nodes belonging to the same THS contend with each other to reserve a time slot and eventually all reserve a unique time slot in the THS. This is illustrated in FIG. 3, where node x and node z share the same slot 7 because they do not belong to the same THS. On the other hand, node w and node x are assigned different time slots, i.e., slots 0 and 7, because they are in the same OHS. Similarly, node w and node y are assigned different time slots because they are in the same OHS. Node x and node y also are assigned different time slots because they belong to the same THS, namely THS 1.

Figure 4:
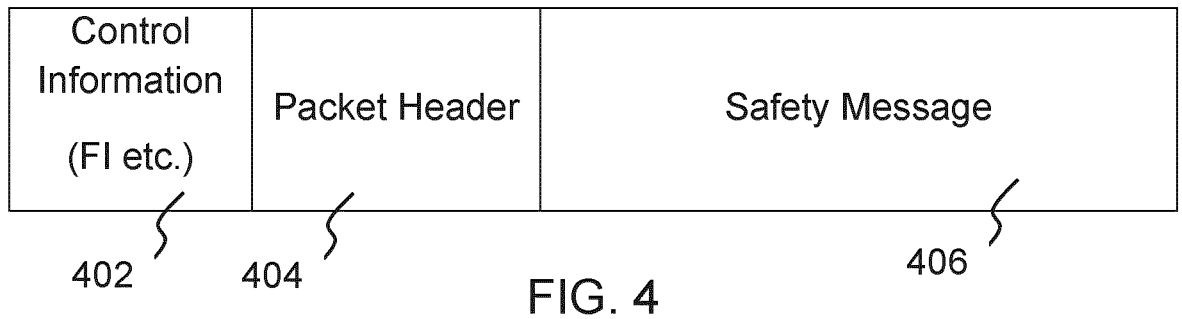
FIG. 4 shows an example of data packet transmitted by nodes in the system of FIG. 1.

A time slot 204 is said to be reserved for a node 102 or owned by the node 102 when the slot is associated or paired with the node's index or ID. Referring to FIG. 4, a packet may be partitioned into three components, namely control information 402 such as frame information (FI), packet header 404 (PH), and safety messages 406. The FI from a node includes the information of pairing of the node's ID and its corresponding time slot as well as the pairing of all one-hop neighboring nodes' IDs of the transmitting node and their respective corresponding time slots. The pairing of a node's ID and its corresponding time slot reserves the time slot, i.e., the time slot is owned by the node.

Figure 5:
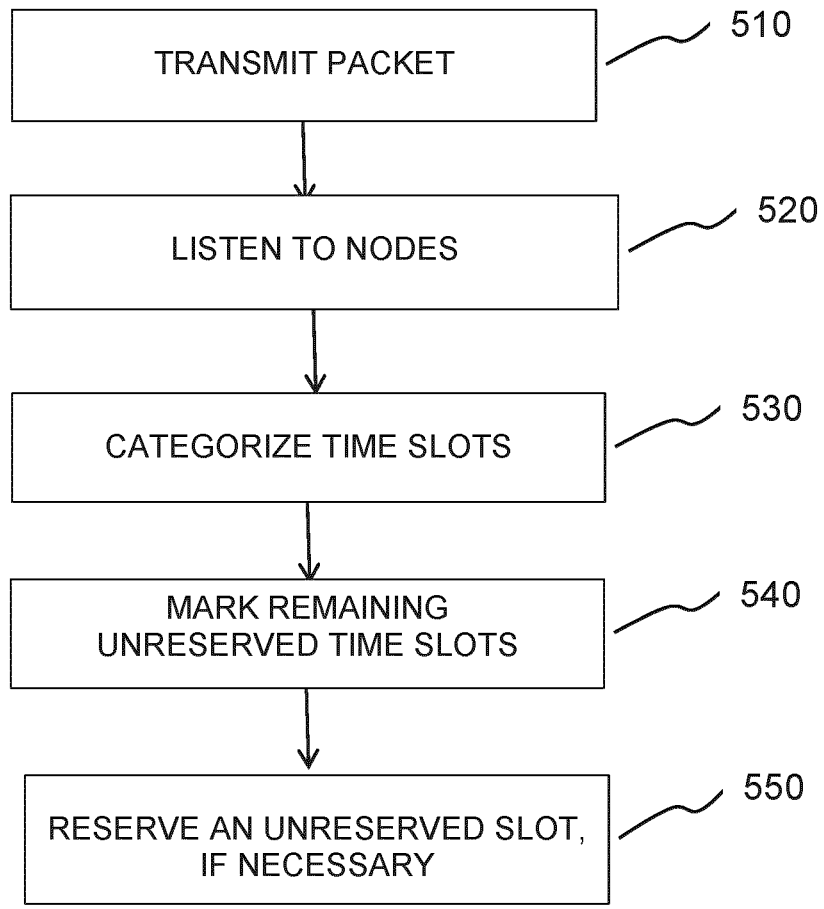
FIG. 5 is a flow diagram showing one example of categorizing time slots as either reserved or unreserved.

The following describes a procedure for a node to identify reserved and unreserved time slots in a time frame using frame information. Referring to FIG. 5, a node 102 starts to transmit (step 510) its packet, in each time frame 202, when the time slot 204 that it owns starts, and ends its transmission before the end of the time slot. Of course, if a node does not have a slot reserved, for example, because it has released it in a prior time frame, the node will skip this transmission step. Aside from this transmission step during the time slot owned by a node, the node must listen to the channel (step 520) over the period of the time frame, i.e., the entire F consecutive time slots (if it does not own any time slot) or the entire F consecutive time slots other than its own (if it owns at least one time slot). After completing listening to a time slot in a time frame, each node categorizes the time slot as either reserved or unreserved (step 530).

Figure 6:
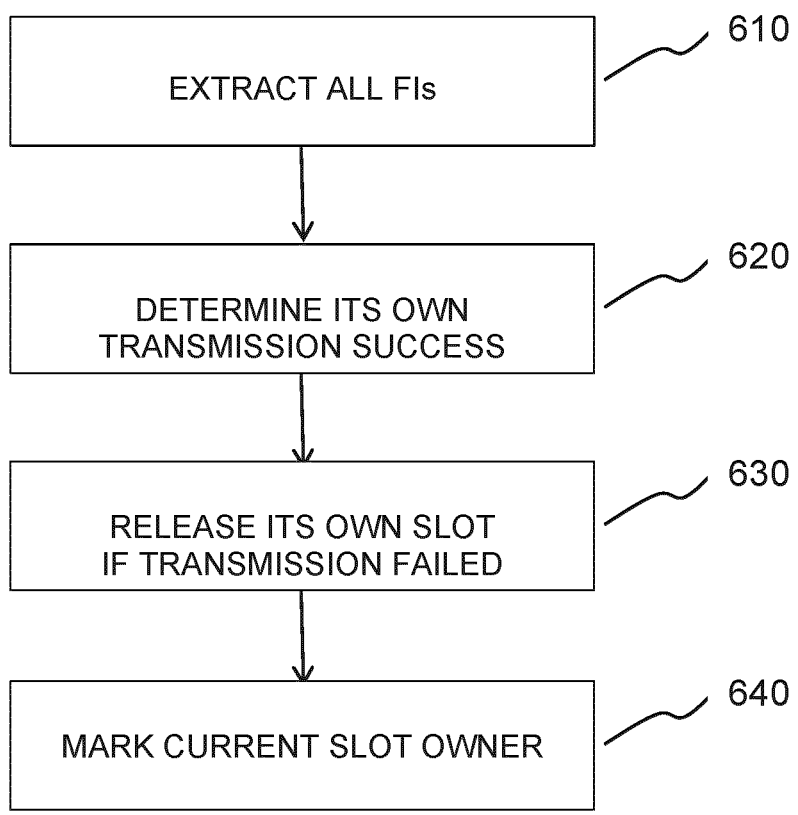
FIG. 6 is a flow diagram showing one example of determining owner of current time slot.

FIG. 6 shows in further detail the steps of one method of categorizing the time slot as either reserved or unreserved. After successfully receiving a packet during a time slot from a transmitting node, its neighboring nodes perform the following four steps (steps 610 to 640) before the start of the next time slot.

First, each neighboring node retrieves the message embedded in the packet and extracts FI (step 610) from the packet received. Successful reception of FIs (or successful reception of packets in which FIs of the transmitting nodes are embedded) helps a node to extract its neighborhood information, such as IDs of the one-hop neighboring nodes and the time slots ownership information of the transmitting nodes.

Second, based on FI received from the transmitting node, each node determines if the transmission during their own time slots with the transmitting node was successful or not (step 620). FI may be used to detect transmission failures during a time slot. Considering two nodes, node A and node B, and let node B be the transmitting node, and node A be the node that examines the FI received from node B. A node will not include ID(s) of its neighboring node(s) in its FI, if it fails to receive packet(s) during the respective time slot(s). From the FI received, or more particularly, the information of pairing of node IDs and their corresponding time slot assignments, a node, such as node A, may determine whether its own transmission was successfully received by the transmitting node, in this case node B. Namely, if node B does not include in its FI the ID information of node A, node A may infer that its own transmission to node B was not successful, and vice versa.

Third, a node releases its time slot (step 630), thus, making the time slot available to other nodes for reservation, or becoming an unreserved time slot, if a packet it transmitted during its own time slot is not received by at least one of its OHS neighbors. Therefore, if a node, such as node A, fails to detect its ID in the FI of the transmitting node, such as node B, it means that at least the transmitting node did not receive the packet (e.g., due to either transmission or receiving failure). It will then release its own reserved time slot (not the current time slot) from node A, i.e., disassociate its ID with the time slot and makes the time slot available to other nodes as an unreserved time slot.

Fourth, based on FI received from the transmitting node, each node also determines ID of the transmitting node and mark the transmitting node as the owner of the current time slot (step 640).

Referring back to FIG. 5, after completing listening to all time slots in a time frame, all nodes mark the remaining unreserved time slots (step 540). Any time slot during which no packet is received is marked as unreserved. This can be done because either no node is transmitting in this time slot, i.e., no node owns or has reserved this time slot, or packet from the node that owns the time slot was not successfully received, in which case the node that failed would have released this time slot already, making it unreserved.

After all time slots have been categorized as either reserved or unreserved at step 540, if a node still does not own a time slot, i.e., if it is necessary for the node to reserve a time slot, the node will select one time slot from the pool of unreserved time slots and reserve it (step 550). This may be done by randomly selecting one time slot among the unreserved ones and attempts to reserve it. After each node has reserved its time slot, or continue owns its reserved time slot, all time slots in a time frame is categorized as either reserved or unreserved.

Of course, what described in connection with FIGS. 5 and 6 is merely one way of identifying reserved and unreserved time slots in a time frame. Any other suitable method of identifying these time slots may be used.

Figure 7:
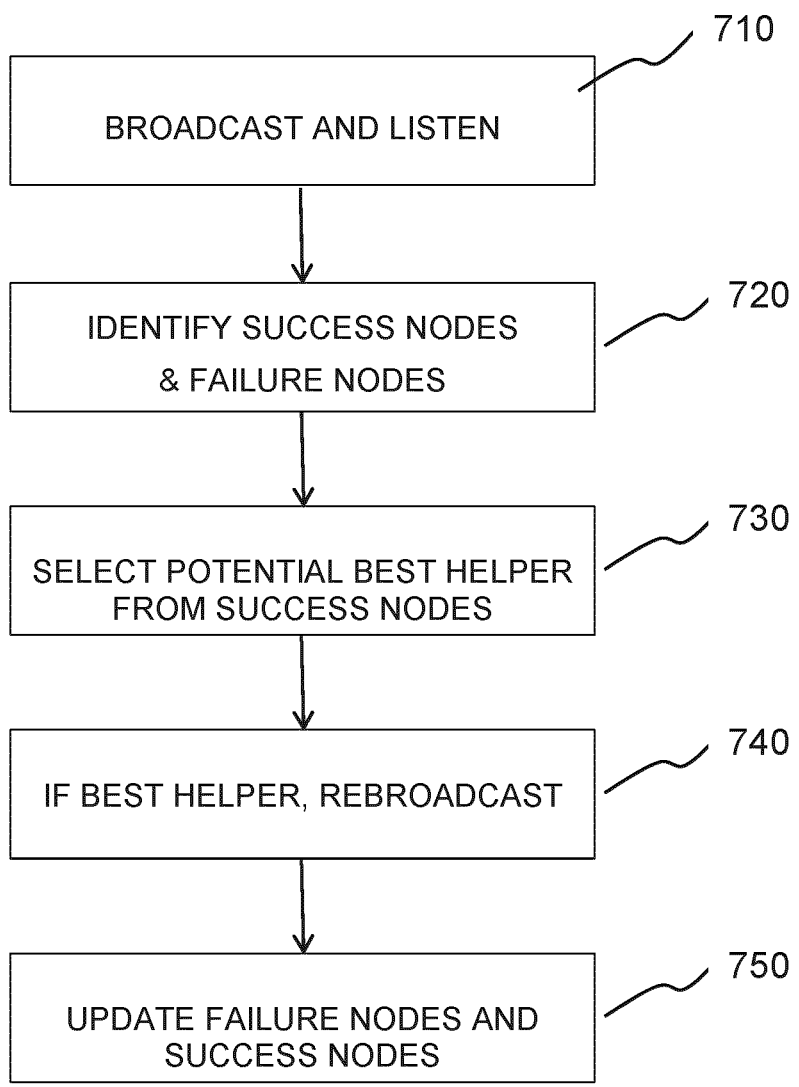
FIG. 7 is a flow diagram showing a process of implementing a cooperative relay broadcasting method.

FIG. 7 is a flow diagram illustrating the steps of one method that implements CRB. After a transmitting node, or source node S, broadcasts a packet, referred to as tagged packet, to its one-hop neighboring (OHN) nodes, it is possible that some of its OHN nodes fail to receive the tagged packet. CRB is used to correct these failures by rebroadcasting the tagged packet from a node that successfully received the tagged packet from the source node S. This rebroadcasting node or relay node is referred to as helper node and is one of the OHN nodes of the source node S.

Referring to FIG. 7, each node, say node r, first either listens to other nodes, in all time slots that are not reserved by the node r, or broadcasts its own data packet, if the time slot is reserved by the node (step 710). Next, based on information received thus far, through listening to other nodes (i.e., receiving data packets transmitted by other nodes), the node r identifies those failure nodes (step 720) in the OHN of source node S that did not and will not successfully receive the tagged packet from source node S, i.e., did not receive the tagged packet directly from the source node, and also did not and will not receive the tagged packet through CRBs. The remaining nodes in the OHN of source node S will be identified as success nodes, i.e., nodes either received the tagged data packet directly from source node S, or received or will receive it indirectly through CRBs. This is further explained below.

Consider nodes that are in one-hop transmission distance of a source node. The source node, denoted as S, broadcasts a tagged packet to its one-hop neighboring nodes. Due to channel errors, some nodes fail to receive this tagged packet. Let the sets of nodes that have and do not have the tagged packet be denoted as H and D, respectively. Nodes in sets H and D are referred to as potential helper nodes (PHNs) and potential destination nodes (PDNs), respectively. However, to a given node in the OHN nodes, it will only know if a node belongs to H or belongs to D after it has received that node's FI. In other words, neighbors of a node will need to wait until it is the node's turn to broadcast, i.e., the time slot owned by the node, to know whether the node has received the tagged packet. To solve this difficulty, each node in H combines the knowledge of confirmed success or confirmed failure, i.e., information reported by nodes who have already broadcasted in their own time slots, with prediction for these nodes that are still waiting for their turns to broadcast. Details of making the estimate and prediction will be described in reference to FIG. 8 and FIG. 9.

As soon as the source node has finished transmitting the packet, PHNs in set H wait for an unreserved time slot, which may be the next immediate unreserved time slot, to perform CRB of the packet to serve the PDNs in their corresponding OHSs. While waiting for the unreserved time slot, each PHN, i.e., each node in H evaluates all nodes in H, including itself, that may be a potential best helper node among all of its OHS neighbors (step 730). A best helper node is a node that is best suited, among all nodes in H, for rebroadcasting the tagged packet to most PDNs. In other words, the best helper node may be selected as the one which has a good channel condition to a maximum number of PDNs.

The quality of wireless channel, which nodes use to transmit packets, during the entire duration of a time slot can be predicted. Any suitable method may be used to predict the channel quality. For example, the quality or probability of successful transmission and reception can be obtained from lower level (physical layer) of the protocol stack using the information such as velocities and positions of nodes in the network. Here, the prediction is mainly done to decide whether the transmitted packets can be successfully delivered from one node to another node. Thus, the channel quality during the entire duration of each time slot can be predicted to be in either good or bad state. As nodes are aware of the positions and velocities of their one-hop neighboring nodes, they can determine the set of probability of successful packet transmission to the corresponding neighboring nodes. Probability values in such a set are then compared with a specified threshold value to predict the state of wireless channel with corresponding one-hop neighbors. The channel, between a pair of source and destination nodes, is predicted to be in the good state if the quality of channel is such that the transmitted packet from the source node is successfully delivered to the destination nodes with a probability greater than a specified threshold; otherwise, the channel is considered to be in the bad state. The prediction method may be used to predict the quality of wireless channel between a potential helper node and potential destination node. When qualities for all potential helper nodes are predicted, the potential helper node with the best predicted quality will be determined to be the best helper node.

Next, in an unreserved time slot, such as the next unreserved time slot or idle slot, the best helper node so determined performs CRB, i.e., rebroadcasts the tagged packet (step 740). It will be appreciated that each tagged packet has an expiry time, after which the information in the tagged packet is not valid anymore. For presentation clarity, consider that a packet expires after the duration of one time frame from the start of source node's time slot. Rebroadcasting of the tagged packet should not be done after its expiry time. Thus, the idle time slots during which to rebroadcast tagged packet must be one selected from the current time frame. In any event, the idle slot must be one in which the tagged packet has not expired. On receiving the packet successfully from the best helper nodes, a PDN may become a PHN. The sets H and D are updated accordingly (step 750). The best helper node that just performed CRB may update its perceived H and D based on its prediction when estimating nodes in D that it can reach. Other nodes in OHN may update their own respective H and D based on FIs actually received.

These steps of determining set of potential destination nodes, identifying best helper node, and rebroadcasting by the best helper node in an unreserved time slot are repeated until no failure node remains or the tagged packet expires. This is further explained below.

Figure 8:
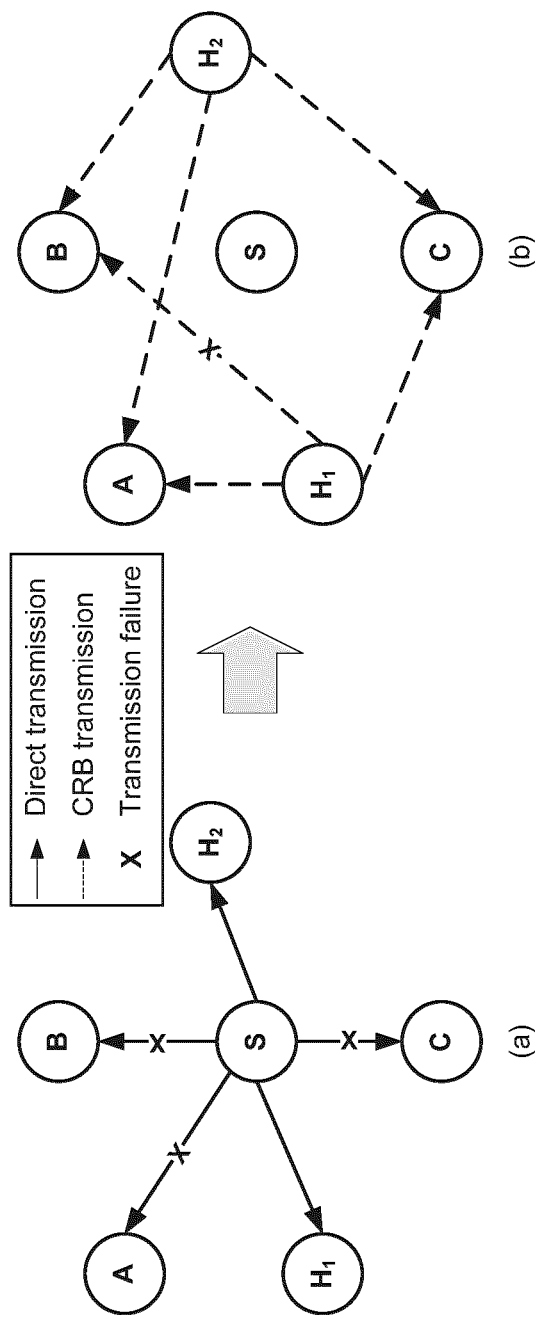
FIG. 8 illustrates an example of selecting a best helper node.

The best helper node should be chosen in such a way that it improves the transmission reliability. The goals are to (a) maximize the number of nodes which successfully receive the packet before it expires, and (b) minimize the transmission delay, such that the broadcast packet can spread faster among one-hop neighbors of the source node. A simple example to illustrate this selection process is provided in FIG. 8. As indicated in FIG. 8(*a*), after broadcasting by source node S, nodes A, B, C failed to receive the transmitted packet from source node S but nodes $H_1$ and $H_2$ did. According to evaluations performed by nodes $H_1$ and $H_2$, the details of which will be described below, node B will not be reachable by node $H_1$ during a single CRB transmission but will be reachable by node $H_2$. Nodes $H_1$ and $H_2$ both can reach nodes A and C. Accordingly, node $H_2$ is selected as the best helper node over node $H_1$ because node $H_2$ can reach more failure nodes or destination nodes during a single CRB transmission than $H_1$ can. Further, once the best helper is selected, cooperative relay broadcast may be performed during all the available unreserved time slots so that the broadcast packet can spread faster among one-hop neighbors of the source node S.

Figure 9:
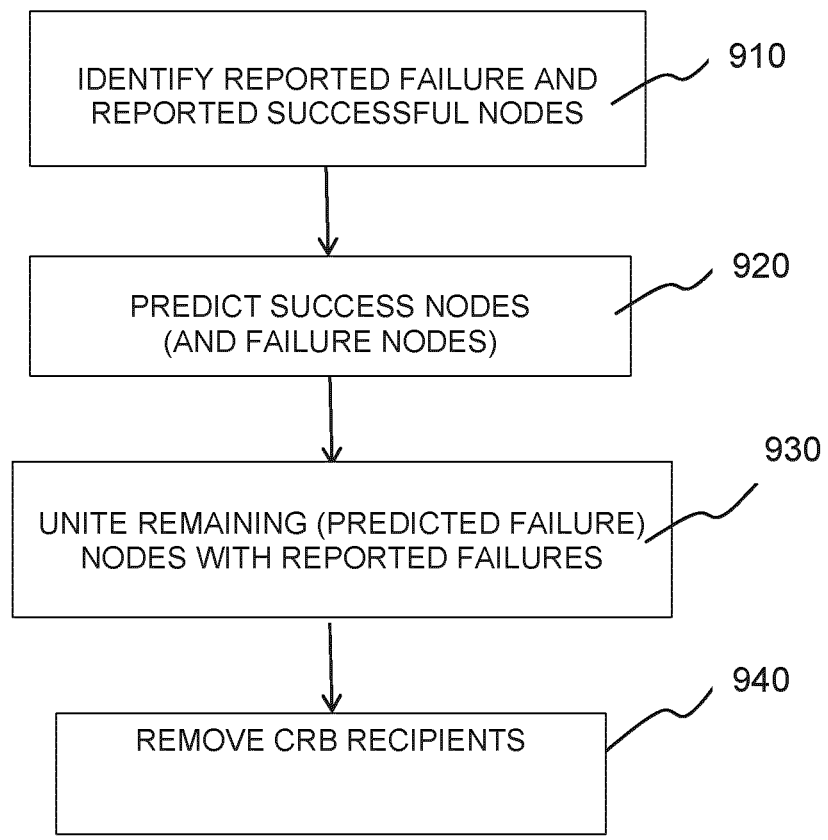
FIG. 9 is a flow diagram showing a method of categorizing nodes in a one-hop-neighborhood into failure nodes and success nodes.

To minimize unnecessary evaluation, categorizing nodes in OHS into success and failure nodes may take into account both reported successes and knowledge of CRBs already performed. FIG. 9 illustrates a process that takes into account such factors in categorizing nodes into set H and set D after each CRB transmission.

First, all announced successes and failures are identified (step 910). CRB is performed during an unreserved time slot. Hence, a PHN evaluates itself before the unreserved time slot which it intends to use for CRB. This will be done in parallel with listening the channel (receiving a packet). A PHN, say z in set H, considers itself as the best helper node to rebroadcast the tagged packet if it can successfully deliver the packet to a largest number of nodes in set D. While evaluating the number of neighboring nodes in set D, node z counts its one-hop neighbors in $O_z$ that have already announced transmission reception failures during their time slots, referred to as reported failed nodes $R_{zf}$ (whose time slots are earlier than the selected unreserved time slot in the current frame). Node z also identifies all nodes that have announced their success of receiving the transmission.

For the discussion that follows, $R_{zf}$ and $P_{zf}$ denote the sets of reported and predicted fail nodes, respectively, from the perspective of node z, and $R_{zs}$ and $P_{zs}$ denote the sets of reported and predicted success nodes, respectively, i.e., sets of nodes that have already announced and have not yet announced the successful reception of the tagged packet, respectively. $O_{zf}$ denotes the set of one-hop neighboring nodes which failed to receive the tagged packet from the perspective of node z. Here, $O_{zf}$ does not necessarily include all the nodes in set D that actually failed to receive the packet from the source node S. It is just the set of failed nodes from the perspective of PHN z. The set $O_{zr}=R_{zs} \cup R_{zf}$ (set $O_{zp}=O_z-O_{zr}$) denotes the set of one-hop neighboring nodes of z that have already (not yet) announced their transmission status from the source node.

Next, node z predicts which of those nodes that have not announced their success will be success nodes (i.e., belonging to H) and which of them will be failure nodes (step 920). To do this, node z determines first the sets of reported and predicted successful nodes, denoted as $R_{zs}$ and $P_{zs}$ respectively. The process predicts the transmission status of the remaining one-hop nodes that have not yet accessed the channel to send their packets and determines a set of predicted failure and success nodes (will be discussed later). Nodes predicted to be able to successfully receive the transmission from the source node S, namely, the set $P_{zs}$, are removed from the initially determined set of failed nodes, or not added to $O_{zf}$, in order to exclude them from further evaluation, as illustrated in the flow chart (see step 1010 in FIG. 10). Any nodes in $O_{zp}$ which are predicted to be not able to successfully receive the tagged packet from the source node S, i.e., nodes in $P_{zf}$, will remain, i.e., not removed from the initially determined set of failed nodes. These remaining nodes, i.e., set $P_{zf}$, are determined by following the process in step 1010 in FIG. 10 as will be further described below. The remaining nodes are predicted failure nodes, $P_{zf}$.

Consequently, $O_{zs}=R_{zs} \cup P_{zs}$ denotes the set of one-hop neighboring nodes which successfully received or likely will receive the tagged packet.

Next, the set of one-hop neighboring nodes which failed to receive or likely have failed to receive the tagged packet is determined by uniting (step 930) the set of predicted failures with the set of announced failures, $O_{zf}=R_{zf} \cup P_{zf}$. Note that sets $R_{zs}$ and $R_{zf}$ are determined by node z based on FIs that it received after the source node's time slot. On the other hand, node z estimates sets $P_{zs}$ and $P_{zf}$.

To further avoid redundant transmissions, node z considers CRBs that have already performed in its one-hop neighborhood while estimating the predicted sets. Any CRB recipients, i.e., destination nodes served during the prior CRB, are removed from the set D. In other words, it excludes nodes in set $O_{zf}(=R_{zf} \cup P_{zf})$ (see step 1020 in FIG. 10) which may have received successfully the tagged data packet during the previous CRBs (step 940), according to evaluated probability or likelihood.

Figure 10:
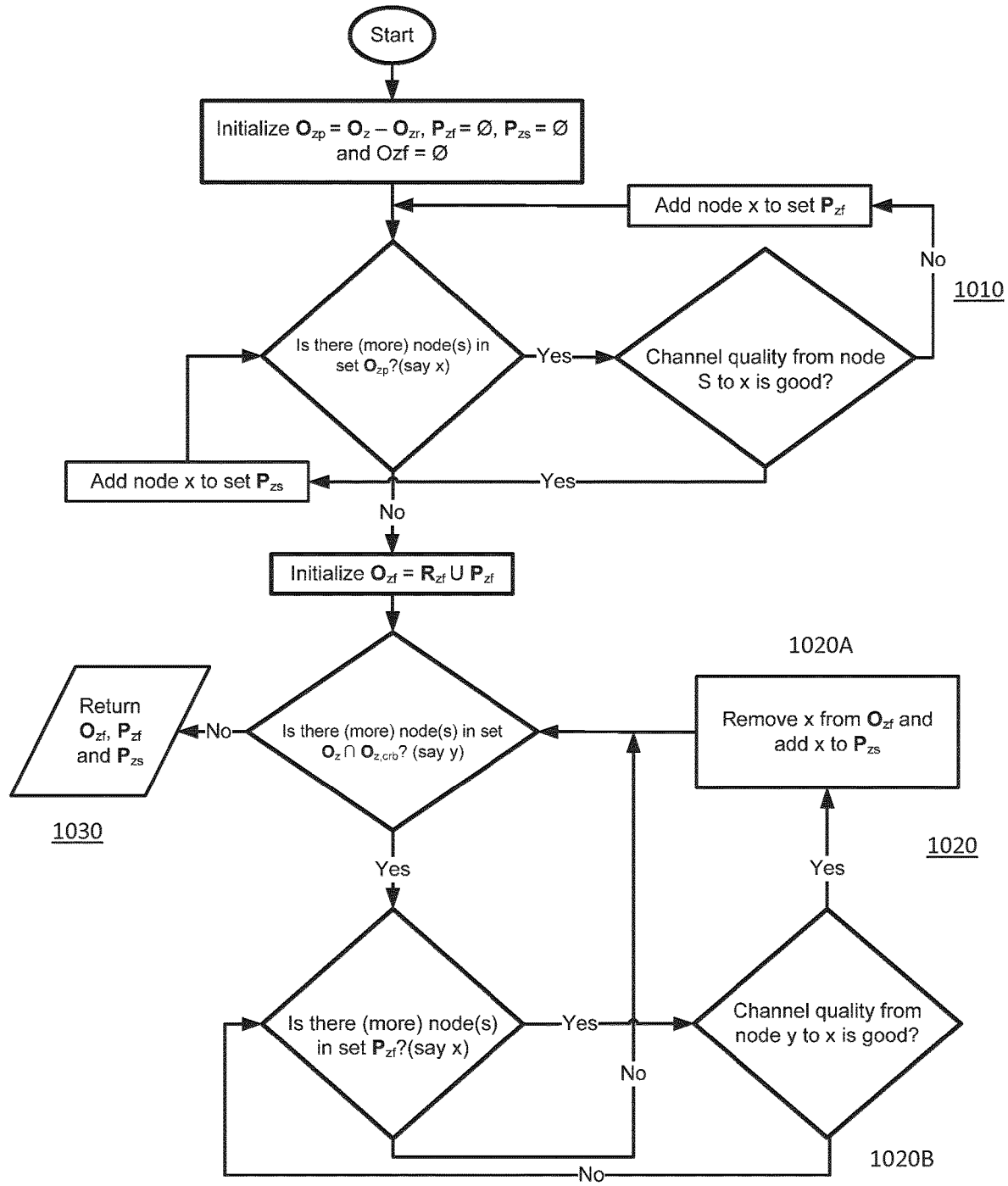
FIG. 10 is a flow chart illustrating in detail a method of categorizing nodes in a one-hop-neighborhood into failure nodes and success nodes.

The procedure to determine such predicted sets from the perspective of a PHN z, i.e., $P_{zf}$ and $P_{zs}$, is further illustrated in detail in a flowchart, namely FIG. 10. In the first loop (step 1010), nodes in set $O_{zp}=O_z-O_{zr}$ are evaluated to categorize, i.e., divide, them into predicted failure nodes $P_{zf}$ and predicted success nodes $P_{zs}$, without taking into account CRB. In the next loop (step 1020), nodes in the initial set of $P_{zf}$ are examined to determine if any nodes in this initial set would have received rebroadcasting from any nodes in the set $O_{z,crb}$, where $O_{z,crb}$ denotes the set of PHNs that are in one-hop transmission distance from node z and already performed CRB before the selected unreserved time slot. Any such nodes that would have received CRB are excluded (step 1020A) from the initial set of $P_{zf}$ to result in the final set of $P_{zf}$, which is a set of nodes that either announced to have failed to receive or are predicted to fail to receive the packet from the source node S and would not have received the CRB from a helper node.

This gives the sets $O_{zf}$, $P_{zs}$ and $P_{zf}$ (step 1030). From them, the set of all success nodes $O_{zs}$ can be determined, by adding back the reported and predicted success:

$$O_{zs} = R_{zs} \cup P_{zs}$$

Of course, the set of all success nodes $O_{zs}$ also can be obtained by excluding from the OHN of node S all failure nodes, i.e., the set of $O_{zf}$.

Figure 11:
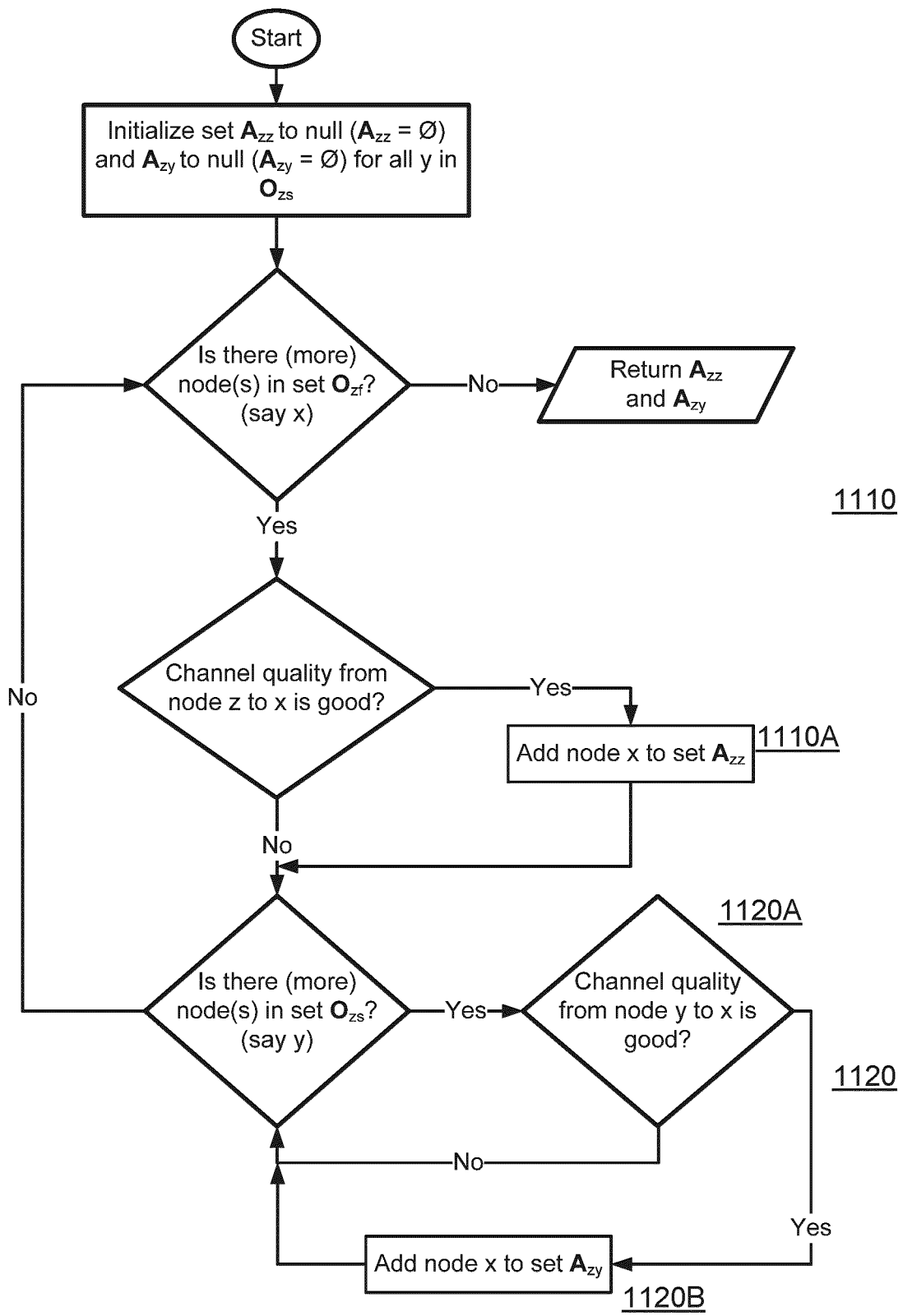
FIG. 11 is a flow chart illustrating in detail a method of identifying potential best helper nodes in a one-hop-neighborhood.

Once sets $O_{zs}$ and $O_{zf}$ are determined, node z evaluates itself with respect to other nodes in set $O_{zs}$ to determine which one of the nodes in $O_{zs}$ is able to reach more nodes in set $O_{zf}$. An example of a process to determine potential best helper nodes is illustrated in FIG. 11.

First, it determines a set of candidate failed nodes $A_{zz}$ (step 1110) to which it can successfully relay the tagged packet. To do this, one may simply evaluate the channel quality between node z and each failure node in $O_{zf}$ and identify members of $A_{zz}$ one by one. This channel evaluation may use the same method as evaluating channel quality state between a source node and its destination node as described earlier in connection with step 730 in FIG. 7. If the channel quality is good, that failure node is added to $A_{zz}$. (step 1110A). If the channel quality is not good, in the next loop (step 1120), PHN z evaluates each of the successful nodes y in set $O_{zs}$ (step 1120A) and adds those with good channel quality to $A_{zy}$ (step 1120B). Thus, PHN z also determines sets $A_{zy}$ for all successful nodes y in set $O_{zs}$ (step 1120). Note that, set $A_{xy}$ consists of both reported and predicted failed node that are in good channel condition with node y from the perspective of node x. The nodes among $A_{zz}$ and $A_{zy}$ that can reach the largest number of failure nodes in $O_{zs}$ is/are the best potential helper node(s). To each PHN z that is performing the evaluation, if there is another node in the OHN that can reach more failed nodes, then the PHN z that may determine that itself will not be a best helper node and may stop evaluating further nodes. A PHN z will continue evaluating other nodes if no other node may reach more failed nodes than itself. Should there be a tie, any suitable tie-breaker may be used. One simple tie-breaker is to compare the IDs of the tied best potential helper nodes and the one with the largest ID is selected as the potential best helper. Of course, any other suitable tie-breaker may be employed. For example, such a tie-breaker may be based on the smallest ID, lowest index of the time slot, or the highest index of the time slot owned by the helper nodes, among others.

Thus, based on $A_{zz}$ and $A_{zy}$, node z performs CRB in the selected unreserved time slot, if all of the following conditions are satisfied:

1. There is at least one failed node, either predicted or reported, which can successfully receive the tagged packet from z, i.e., $|A_{zz}| > 0$;
2. Node z can relay the packet to a largest number of failed nodes (both predicted and reported combined) among all nodes in $O_{zs}$, i.e., $|A_{zz}| > |A_{zy}|$ for any node y in set $O_{zs}$;
3. If $|A_{zy}| = |A_{zy}|$ for any node(s) y in set $O_{zs}$, i.e., if there is a tie, node z relays the packet only if node z is a tie-breaker winner, e.g., if node z's ID is less than the ID of node(s) y.

Note that a PHN evaluates (itself and its successful PHS neighbors) from its own perspective and does not interact with other PHN nodes. Thus, errors may occur when two or more PHNs that are in each other's one-hop distance may find themselves as the best potential helper nodes to relay the tagged packet. In such an event, simultaneous CRBs result in transmission collisions and waste cooperation opportunities.

Figure 12:
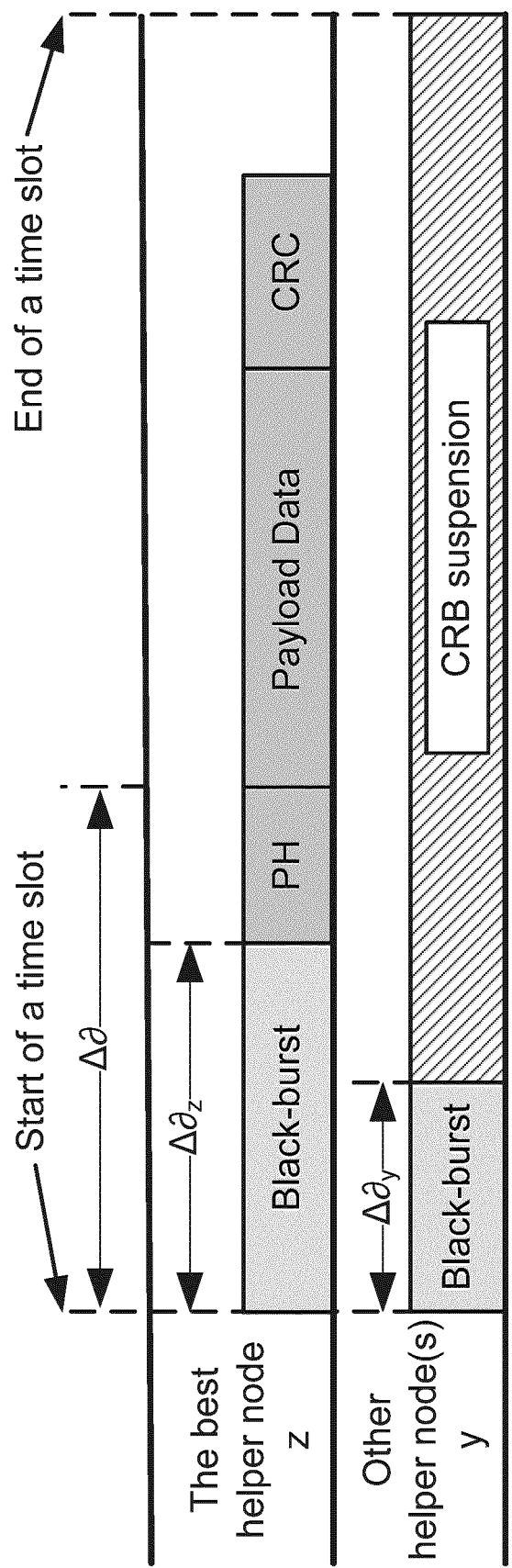
FIG. 12 illustrates the breaking of tie when several potential best helper nodes attempt to transmit in the same time slot.

To avoid such undesired events, each best potential helper node uses an energy-burst or channel jamming signal, also known as black-burst, to prevent collision, to decide which one of them will be selected as the best helper node. In doing so, after finding itself as the best potential helper node, node z transmits a black-burst for a random time interval, say $\partial_z \Delta$ time units from the start of a time slot, where $\partial_z$ is randomly drawn from set $\{1, 2, \ldots, \partial\}$ and $\Delta$ is a fixed and small time duration. As soon as a node z finishes transmitting the black burst, it listens to the channel and relays the tagged packet if the channel is idle. In other words, among the group of self-perceived best potential helper nodes, only one of them will relay the tagged packet, namely, the one that has selected the longest black-burst period. This node is selected as the best helper node among the group of best potential helper nodes and is to perform CRB in the idle time slot. This is illustrated in FIG. 12 where node y, whose black-burst transmission interval is less than that of node z, suspends its relay transmission after detecting the channel to be busy due to the black-burst transmission from node z, i.e., if it can detect another black-burst signal after it finishes transmitting its own. When node y with a smaller black-burst period detects the black-burst from node z, it suspends its potential CRB. With a large a value the probability that two or more PHNs choosing the same black-burst period is small. Thus, performing CRB after a random time interval from the start of a time slot reduces transmission collisions from two or more potential helper nodes in CRB.

It will be appreciated that the sum of $\partial \Delta$ seconds and the transmission time of a CRB packet should not be greater than the duration of a time slot. As each node owns a time slot to transmit a complete packet, repeated transmission of the FI during CRB is unnecessary. Hence, a packet from the best helper node consists of a PH, payload data and cyclic redundancy check (CRC). The absence of FI compensates for the black-burst period and should not affect the normal operation of the base MAC protocols. Furthermore, a PHN finds the channel busy if the unreserved time slot that it selects for CRB is reserved by at least one node that is in its one-hop distance. In such a case, it suspends its CRB as it finds the channel to be busy.

Various embodiments of the invention have now been described in detail. Those skilled in the art will appreciate that numerous modifications, adaptations and variations may be made to the embodiments without departing from the scope of the invention, which is defined by the appended claims. The scope of the claims should be given the broadest interpretation consistent with the description as a whole and not to be limited to these embodiments set forth in the examples or detailed description thereof

What is claimed is:

1. A method of rebroadcasting messages to improve vehicular communications among a plurality of nodes in a vehicular ad hoc network, the plurality of nodes communicating with each other following a time division multiple access (TDMA) protocol, wherein time is partitioned into time frames, each time frame is partitioned into time slots, and each node is to be assigned one of the time slots for transmission, the method comprising the steps of, at a node of the plurality of nodes and by the node,
   a) broadcasting in its assigned time slot in a time frame and listening to other nodes in all other time slots in the time frame, b) if, during listening, data is received in a time slot from a transmitting node that is a one-hop neighbor (OHN) of both the node and another node that is a source node having transmitted previously in the time frame a tagged data packet,
  1) dividing all OHN nodes of the source node into a set of success nodes and a set of failure nodes, with respect to the source node, by utilizing frame information received from the transmitting node and from other OHN nodes,
  2) before expiry of the tagged data packet and if the set of failure nodes has at least one member,
    i. determining if the node is a potential best helper node to rebroadcast the tagged data packet,
    ii. in an unreserved time slot subsequent to the time slot, rebroadcasting the data packet if the node is determined to be a best helper node, and
    iii. updating the set of failure nodes and the set of success nodes after rebroadcasting.

2. The method of claim 1, wherein in step b), the sub-step 1) of dividing further comprising:
identifying success nodes in the OHN nodes that have reported successful receipt of the tagged data packet and failure nodes in the OHN nodes that have reported failure of receipt of the tagged data packet,
for each node in the remainder of the OHN nodes, excluding the success nodes, evaluating the likelihood of a recipient node in the remainder of the OHN nodes that is able to receive the tagged data packet from the source node and categorizing the recipient node as a failure node if the likelihood is not above a selected threshold value and as a success node if the likelihood is above the selected threshold value, and
unifying the failure nodes that have reported failure with the failure nodes having the likelihood not above the selected threshold value to form the set of failure nodes.

3. The method of claim 2, wherein the set of success nodes is formed by either unifying the success nodes that have reported success with the success nodes having the likelihood above the selected threshold value or is formed by excluding the set of failure nodes from the OHN nodes.

4. The method of claim 2, wherein the evaluation of likelihood of being able to receive the tagged data includes evaluation of whether the recipient node can receive the tagged data packet in the current time slot or in future time slots in the time frame.

5. The method of claim 2, wherein the evaluation of likelihood of being able to receive the tagged data includes evaluating likelihood of the recipient node receiving the tagged data packet indirectly through cooperative relay broadcasting (CRB), the step of dividing further comprising:
removing the recipient node from the set of failure nodes if the likelihood of the recipient node receiving the tagged data packet through CRB exceeds the selected threshold value.

6. The method of claim 1, wherein in step b.2), the step of determining if the node is a potential best helper node further comprises:
evaluating number of failure nodes, the nodes is predicted to be able to reach in a single CRB transmission,
evaluating number of failure nodes that each of the other of success nodes is predicted to be able to reach in a single CRB transmission,
if no other success node is evaluated to be able to reach more failure nodes than the node, designating the node as the potential best helper node, and
if at least another success node is evaluated to be able to reach an equal number of failure nodes as the node, selecting the potential best helper node among the node and the at least another success node through a tie-breaker.

7. The method of claim 6, wherein the nodes is predicted to be able to reach a failure node if the likelihood of the failure node receiving the tagged data packet indirectly through cooperative relay broadcasting (CRB) from the node is above the selected threshold value.

8. The method of claim 6, wherein the tie-breaker is based on value of one of identification number and index of time slot.

9. The method of claim 1, the step of rebroadcasting comprising, performed at each potential best helper nodes and by each of the potential best helper nodes:
selecting a random short-burst period shorter than the time slot,
transmitting a channel jamming signal during the short-burst period,
upon finishing transmission of the channel jamming signal, listening for other channel jamming signals in the time slot,
if any other channel jamming signal is detected, performing no rebroadcasting, and
if no channel jamming signal is detected, broadcasting the tagged data packet in the remainder of the time slot.

10. The method of claim 1, further comprising,
if no data is received in a time slot, marking the time slot as unreserved.

11. The method of claim 10, the step b) further comprising:
from the frame information received, determining if any OHN node of the node has failed to receive a data packet from the node, and
if there is at least one OHN node that has failed, selecting another time slot from unreserved time slots available in the time frame and making the previously reserved time slot available as unreserved.

12. The method of claim 11, wherein a time slot is reserved by including information associating a node with the time slot in the frame information and is made available as unreserved by disassociating the node with the time slot.

13. The method of claim 2, the step of rebroadcasting comprising, performed at each potential best helper nodes and by each of the potential best helper nodes:
selecting a random short-burst period shorter than the time slot,
transmitting a channel jamming signal during the short-burst period,
upon finishing transmission of the channel jamming signal, listening for other channel jamming signals in the time slot,
if any other channel jamming signal is detected, performing no rebroadcasting, and
if no channel jamming signal is detected, broadcasting the tagged data packet in the remainder of the time slot.

14. A system of a plurality of nodes communicating with each other in a vehicular ad hoc network, the plurality of nodes communicating with each other following a time division multiple access (TDMA) protocol, wherein time is partitioned into time frames, each time frame is partitioned into time slots, and each node is to be assigned one of the time slots for transmission, wherein each node of the plurality of nodes a) broadcasts in its assigned time slot in a time frame and listens to other nodes in all other time slots in the time frame, and b) if, during listening, data is received in a time slot from a transmitting node that is a one-hop neighbor (OHN) of both the listening node and another node that is a source node having transmitted previously in the time frame a tagged data packet, the listening node 1) divides all OHN nodes of the source node into a set of success nodes and a set of failure nodes, with respect to the source node, by utilizing frame information received from the transmitting node and from other OHN nodes, 2) before expiry of the tagged data packet and if the set of failure nodes has at least one member,
   i. determines if the listening node is a potential best helper node to rebroadcast the tagged data packet,
   ii. in an unreserved time slot subsequent to the time slot, rebroadcasts the data packet if the listening node is determined to be a best helper node, and
   iii. updates the set of failure nodes and the set of success nodes after rebroadcasting.

15. The system of claim 14, wherein in step b), the sub-step 1) of dividing further comprising:

identifying success nodes in the OHN nodes that have reported successful receipt of the tagged data packet and failure nodes in the OHN nodes that have reported failure of receipt of the tagged data packet, for each node in the remainder of the OHN nodes, excluding the success nodes, evaluating the likelihood of a recipient node in the remainder of the OHN nodes that is able to receive the tagged data packet from the source node and categorizing the recipient node as a failure node if the likelihood is not above a selected threshold value and as a success node if the likelihood is above the selected threshold value, and unifying the failure nodes that that have reported failure with the failure nodes having the likelihood not above the selected threshold value to form the set of failure nodes.

16. The method of claim 15, wherein the evaluation of likelihood of being able to receive the tagged data includes evaluation of whether the recipient node can receive the tagged data packet in the current time slot or in future time slots in the time frame.

17. The system of claim 14, wherein in step b.2) the step of determining if the node is a potential best helper node further comprises:

evaluating number of failure nodes the nodes is predicted to be able to reach in a single CRB transmission, evaluating number of failure nodes that each of the other of success nodes is predicted to be able to reach in a single CRB transmission, if no other success node is evaluated to be able to reach more failure nodes than the node, designating the node as the potential best helper node, and if at least another success node is evaluated to be able to reach an equal number of failure nodes as the node, selecting the potential best helper node among the node and the at least another success node through a tie-breaker.

18. The system of claim 14, the step of rebroadcasting comprising, performed at each potential best helper nodes and by each of the potential best helper nodes:

selecting a random short-burst period shorter than the time slot, transmitting a channel jamming signal during the short-burst period, upon finishing transmission of the black-burst, listening for other channel jamming signals in the time slot, if any other channel jamming signal is detected, performing no rebroadcasting, and if no channel jamming signal is detected, broadcasting the tagged data packet in the remainder of the time slot.

19. The method of claim 15, wherein the set of success nodes is formed by either unifying the success nodes that have reported success with the success nodes having the likelihood above the selected threshold value or is formed by excluding the set of failure nodes from the OHN nodes.

20. The system of claim 15, the step of rebroadcasting comprising, performed at each potential best helper nodes and by each of the potential best helper nodes:

selecting a random short-burst period shorter than the time slot, transmitting a channel jamming signal during the short-burst period, upon finishing transmission of the black-burst, listening for other channel jamming signals in the time slot, if any other channel jamming signal is detected, performing no rebroadcasting, and if no channel jamming signal is detected, broadcasting the tagged data packet in the remainder of the time slot.

* * * * *